(12) United States Patent
Vanderspurt et al.

(10) Patent No.: US 8,513,157 B2
(45) Date of Patent: Aug. 20, 2013

(54) DEACTIVATION RESISTANT PHOTOCATALYSTS

(75) Inventors: Thomas Henry Vanderspurt, Glastonbury, CT (US); Treese Hugener-Campbell, Coventry, CT (US); Norberto O. Lemcoff, Simsbury, CT (US); Stephen O. Hay, Tolland, CT (US); Wayde R. Schmidt, Pomfret Center, CT (US); Joseph J. Sangiovanni, West Suffield, CT (US); Zissis A. Dardas, Worcester, MA (US); Di Wei, Manchester, CT (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 13/173,533

(22) Filed: Jun. 30, 2011

(65) Prior Publication Data
US 2012/0003134 A1    Jan. 5, 2012

Related U.S. Application Data

(62) Division of application No. 12/302,626, filed as application No. PCT/US2007/012855 on May 31, 2007, now abandoned.

(60) Provisional application No. 60/809,995, filed on Jun. 1, 2006, provisional application No. 60/810,022, filed on Jun. 1, 2006.

(51) Int. Cl.
| | |
|---|---|
| *B01J 21/06* | (2006.01) |
| *C01G 23/047* | (2006.01) |
| *B01D 53/34* | (2006.01) |
| *B01D 53/72* | (2006.01) |
| *B01D 53/44* | (2006.01) |

(52) U.S. Cl.
USPC ........... 502/350; 502/502; 502/515; 502/516; 502/517; 502/518; 502/527.24; 423/245.1; 423/610; 977/903; 977/775; 977/776; 977/811

(58) Field of Classification Search
USPC ................... 502/350, 502, 515–518, 527.24; 423/245.1, 610; 977/903, 775, 776, 811
See application file for complete search history.

(56) References Cited

U.S. PATENT DOCUMENTS
| | | |
|---|---|---|
| 5,006,248 A | 4/1991 | Anderson et al. |
| 5,668,076 A | 9/1997 | Yamagushi et al. |

(Continued)

FOREIGN PATENT DOCUMENTS
| | | |
|---|---|---|
| JP | 2000102596 A | 4/2000 |
| JP | 2002085967 A | 3/2002 |

(Continued)

OTHER PUBLICATIONS

Sun, R., A. Nakajima, T. Watanabe, and K. Hashimoto, "Decomposition of gas-phase octamethyltrisiloxane on TiO2 thin film photocatalysts-catalytic activity, deactivation, and regeneration," Journal of Photochemistry and Photobiology A: Chemistry 154 (2003), pp. 203-209.*

(Continued)

*Primary Examiner* — Stanley Silverman
*Assistant Examiner* — Diana J Liao
(74) *Attorney, Agent, or Firm* — Cantor Colburn LLP

(57) ABSTRACT

The present disclosure relates to a fluid purification device that has a deactivation resistant photocatalyst having nanocrystallites of less than 14 nanometers (nm) in diameter with at least 200 $m^2$ surface area/$cm^3$ of skeletal volume in cylindrical pores of 5 nm in diameter or larger, with the mode of the pore size distribution 10 nm or more.

12 Claims, 5 Drawing Sheets

(56) References Cited

U.S. PATENT DOCUMENTS

| | | |
|---|---|---|
| 5,718,878 A | 2/1998 | Zhang |
| 5,933,702 A | 8/1999 | Goswami |
| 6,063,343 A | 5/2000 | Say et al. |
| 6,136,203 A | 10/2000 | Butters et al. |
| 6,156,211 A | 12/2000 | Gonzalez-Martin et al. |
| 6,221,259 B1 | 4/2001 | Kittrell |
| 6,238,631 B1 | 5/2001 | Ogata et al. |
| 6,241,856 B1 | 6/2001 | Newman et al. |
| 6,531,100 B1 | 3/2003 | Ogata et al. |
| 6,890,373 B2 | 5/2005 | Nemoto et al. |
| 6,908,698 B2 | 6/2005 | Yoshida et al. |
| 2002/0005145 A1 | 1/2002 | Sherman |
| 2002/0050450 A1 | 5/2002 | Newman et al. |
| 2003/0113246 A1 | 6/2003 | Saitou et al. |
| 2003/0150707 A1 | 8/2003 | Carmignani et al. |
| 2003/0202932 A1 | 10/2003 | Elder et al. |
| 2004/0144416 A1 | 7/2004 | Wang et al. |
| 2004/0202723 A1 | 10/2004 | Yu et al. |
| 2004/0241427 A1 | 12/2004 | Zhu et al. |
| 2005/0053515 A1 | 3/2005 | Yates et al. |
| 2005/0129589 A1 | 6/2005 | Wei et al. |
| 2005/0129591 A1 | 6/2005 | Wei et al. |
| 2005/0181937 A1 | 8/2005 | Karvinen et al. |
| 2005/0233899 A1 | 10/2005 | Anzaki et al. |
| 2006/0000352 A1 | 1/2006 | Tower et al. |
| 2007/0042906 A1 | 2/2007 | Pitts et al. |

FOREIGN PATENT DOCUMENTS

| | | |
|---|---|---|
| WO | WO2004112958 A1 | 12/2004 |
| WO | WO2006065491 A2 | 6/2006 |
| WO | WO2007143042 A3 | 12/2007 |

OTHER PUBLICATIONS

International Search Report for Intenational Application No. PCT/US07/12855 dated Nov. 27, 2007.

Dagan, Guela and Tomkiewicz, Micha, "TiO2 Aerogels for Photocatalytic Decontamination of Aquatic Environments," The Journal of Physical Chemistry, vol. 97, No. 49, pp. 12651-12655, American Chemical Society (Dec. 9, 1993).

Wang, Chao, Li, Qing and Wang, Ruoding, "Synthesis and characterization of mesoporous iron-doped TiO2," Journal of Materials Science 39, pp. 1899-1901, Kluwer Academic Publishers (2004).

International Preliminary Report on Patentability for International Application No. PCT/US07/12855 dated Apr. 4, 2009.

Written Opinion of the International Searching Authority for Intenational Application No. PCT/US07/12855 dated Nov. 27, 2007.

Extended EP Search Report of the European Patent Office in counterpart foreign Application No. 07795552.4 dated Oct. 31, 2011, 6 pages.

R.I. Bickley et al., Photoadsorption and Photocatalysis at Rutile Surfaces II. Photocatalytic Oxidation of Isopropanol, Journal of Catalysis 31, 398-407 (1973).

J. Chen et al., Effect of Silicone Concentration in Deposition of Silicon-Dioxide in the Corona Discharge of Electrostatic Air Cleaners, Proceedings of the 1999 Fall Topical Conference, pp. 203-210, American Filtration and Separations Society, 1999.

Official Search Report and Written Opinion of the European Patent Office for EP Patent No. 077955551.6 dated Sep. 14, 2009.

J.T. Hanley et al., Improved Test Methods for Electronic Air Cleaners, Indoor Air 2002, Proceedings of the 8th International Conference on Indoor Air Quality and Climate, Monterey, CA 2002.

M. Hirano et al., "Direct Formation of Iron (III)-Doped Titanium Oxide (Anatase) by Thermal Hydrolysis and Its Structural Property", from J. of the Amer. Ceramic Soc. 87(1):35-41 (2004).

A.T. Hodgson et al., Evaluation of Ultra-Violet Photocatalytic Oxidation (UVPCO) for Indoor Air Applications: Conversion of Volatile Organic Compounds at Low Part-per Biillion Concentrations, Sep. 30, 2005, Lawrence Berkeley National Library, Paper LBNL-58936. http://repositories.cdlib.org/lbnl/LBNL-58936.

S. Mahanty et al., "Effect of Sn Doping on the structural and optical properties of sol-gel TiO thin films", from J. of Crystal Growth 216(1):77-81 (2004).

Masatoshi Natamura, "Hydrophilic and photocatalytic properties of the SiO2/TiO2 double layers", Thin Solid Films 496 (2006) 231-135. Published Online: Oct. 3, 2005.

T.N. Obee et al., the Estimation of Photocatalytic Rate Constants Based on Molecular Structure: Extending to Multi-Component Systems, J. Advanced Oxidation Technol., vol. 4, No. 2 (1999).

Ohno et al. "Morphology of a Tio2 Photocatalyst (Degussa, P-25) Consisting of Anatase and Rutile Crystalline Phases", Journal of Catalysis 203, 82-86 (2001).

International Search Report for International Application No. PCT/US2007/012813 mailed Nov. 9, 2007.

Written Opinion for International Application No. PCT/US2007/012813 mailed Nov. 9, 2007.

International Search Report for International Application No. PCT/US2007/12854 mailed Jan. 23, 2008.

Written Opinion for International Application No. PCT/US2007/12854 mailed Jan. 23, 2008.

International Search Report for International Application No. PCT/US07/012820 mailed Nov. 7, 2009.

Written Opinion for International Application No. PCT/US07/012820 mailed Nov. 7, 2009.

J. Peral et al., Heterogeneous Photocatalytic Oxidation of Gas-Phase Organics for Air Purification: Acetone, 1-Butanol, Butyraldehyde, Formaldehyde, and m-Xylene Oxidation, J Catalysis 136, 554-565 (1992).

J. Peral et al., Photocatalyst Deactivation: Oxidation of Decamethyltetrasiloxane, Pyrrole, Indole and Dimethyl Sulfide, Photocatalytic Purification and Treatment of Water and Air, pp. 741-745, Elsevier (1993).

J.L. Perry et al., Air Purification in Closed Environments: Overview of Spacecraft Systems, 2002 NBC Defense Collective Protection Conference, Orlando, FL, Oct. 2002.

E. Piera et al., TiO2 deactiviation during gas-phase photocatalytic oxidation of Ethanol, Catalysis Today 76, 259-270 (2002).

A. Sclafani et al., "Influence of Silver Deposits on the Potocatalytic Activity of Titania", J Catalysis 168 (1): 117-120 (1997).

P. Tower, New Technology for Removal of Siloxanes in Digester Gas Results in Lower Maintenance Costs and Air Quality Benefits n Power Generation Equipment, WEFTEC 03, 78th Annual Technical Exhibition and Conference, Oct. 11-15, 2003.

C.S. Turchi et al., Benchscale Testing of Photocatalytic Oxidation (PCO) to Destroy Volatile Organic Compound (VOC) Emmssions, Technology Transfer #95042791A-ENG, SEMATECH, Apr. 28, 1995.

E.J. Wolfrum et al., Destruction of Volatile Organic Compound (VOC) Emissions by Photocatalytic Oxidation (PCO): Final Report (ESHC003). Technology Transfer # 97013236A-ENG, SEMATECH, Feb. 28, 1997.

Z. Zhang et al., "Role of Particle Size in Nanocrystalline TiO2-Based Photocatalysts", J. Phys. Chem. B 102, 10871-10878 (1998).

Extended EP Search Report of the European Patent Office in counterpart foreign Application No. 07809257.4 dated Apr. 25, 2012, 6 pages.

\* cited by examiner

DEACTIVATION RESISTANT PHOTOCATALYSTS

CROSS-REFERENCE TO RELATED APPLICATIONS

This application is a divisional of U.S. application Ser. No. 12/302,626, filed Nov. 26, 2008 now abandoned, which claims the benefit of PCT Application No. PCT/US2007/012855 filed May 31, 2007, which claims the benefit of U.S. Provisional Application No. 60/809,995, filed Jun. 1, 2006 and U.S. Provisional Application No 60/810,022, filed Jun. 1, 2006.

BACKGROUND OF THE INVENTION

1. Field of the Invention

The present invention relates generally to purification devices having photocatalysts. More specifically, the present invention relates to air purification devices having deactivation resistant photocatalysts.

2. Description of the Related Art

Photocatalytic Oxidation (PCO) is a technology used for elimination or reduction of the level of contaminants in a fluid, like air or water, using the chemical action of light. When ultraviolet (UV) light is used to energize the photocatalyst, the technology is more specifically termed Ultraviolet Photocatalytic Oxidation (UV-PCO).

Semiconductors have a sufficiently wide band gap energetic enough to activate water or surface hydroxyls thus creating .OH radicals and electrons have been used in purification systems for elimination of organic contaminants. These materials include, but are not limited to, titanium dioxide ($TiO_2$), zirconium dioxide ($ZrO_2$), zinc oxide (ZnO), calcium titanate ($CaTiO_3$), tin (stannic) dioxide ($SnO_2$), molybdenum trioxide ($MoO_3$), and the like. Of this group, titanium dioxide ($TiO_2$) is among the most widely-used of the semiconductor photocatalysts because of its chemical stability, relatively low cost, and an electronic band gap that is suitable for photoactivation by UV light.

Buildings, vehicles, aircraft, ships and the like may utilize air purification systems to improve the quality of indoor air thus enabling decreased ventilation, create an improved environment, or both. The quality of indoor air is achieved through air purification using either aerosol removal or gaseous contaminant removal technologies. The use of photocatalysis is a proven technology that provides for the removal of gaseous airborne substances such as volatile organic compounds (hereinafter "VOCs") including toluene and formaldehyde from the air supply.

Photocatalytic air purifiers utilize a substrate or cartridge containing a photocatalyst, usually a titanium oxide based material, that interacts with airborne oxygen and water molecules to form hydroxyl radicals when placed under an appropriate light source, typically an ultraviolet (hereinafter "UV") light source. The hydroxide radicals attack the contaminants thereby initiating oxidation reactions that convert the contaminants into less harmful compounds, such as water and carbon dioxide.

Titanium dioxide ($TiO_2$), is the most stable oxide form of the transition metal titanium. $TiO_2$ is mostly ionic material composed of $Ti^{+4}$ cations and $O^{-2}$ anions. In powder form, $TiO_2$ is white and is widely-used in industry to give whiteness to paint, paper, textiles, inks, plastics, toothpaste, and cosmetics. In crystalline form, $TiO_2$ principally exists as one of three different polymorphic forms: rutile, anatase, and brookite. The two more common polymorphic forms of $TiO_2$, rutile and anatase, have a tetragonal crystal structure, while the less-common brookite form of TiO2 has an orthorhombic crystal structure.

The anatase form of TiO2, which is a low temperature form, has been reported to have the greatest photocatalytic activity of the three polymorphic forms of $TiO_2$ when exposed to UV light. This may be due to a wider optical absorption gap and a smaller electron effective mass in the anatase form that leads to higher mobility of the charge carriers. Anatase is converted to rutile at temperatures above about 600° C. where it is accompanied by crystallite growth and a significant loss of surface area.

The rutile and anatase crystalline structures each have six atoms per unit cell. The anatase form is a body-centered structure and its conventional cell contains two unit cells (i.e., 12 atoms). For both the rutile and anatase forms, titanium atoms are arranged in the crystal structure in such a way that neighboring octahedral units share edges and corners with each other. In the anatase structure, four edges of every octahedral unit are shared edges, as compared within the rutile structure, in which two edges of every octahedral unit are shared edges.

One of the most active of currently-available $TiO_2$ photocatalysts is Degussa Aeroxide $TiO_2$ P25 (Degussa Technical Information TI 1243, Titanium Dioxide P25 as Photocatalyst, March, 2002, Degussa Corporation; Business Line AEROSIL, Parsippany, N.J. 07054) consists of about 80% by weight 20 nm anatase $TiO_2$ crystals and 20% by weight larger, about 40 nm, rutile crystals. On exposure to UV light, electron hole separation can occur. Anatase with a strap gap of 3.20 eV requires higher energy, 385 nm photon, than rutile, 2.95 eV or 420 nm. The hole at the surface takes the form of a hydroxyl radical (.OH) that is a stronger oxidizing agent than ozone or chlorine. The electron on the surface can form active oxygen species through the reduction of dioxygen, perhaps through the formation of superoxide ion, $O_2^-$ and then by its further reduction to peroxide dianion, $O_2^{-2}$ than can on protonation yield hydrogen peroxide. Hydrogen peroxide is believed to be the principal agent of remote photocatalytic oxidation (PCO), which describes the oxidation of substances that are very close to, but not in direct physical contact with, photoactive $TiO_2$. The presence of both hydroxyl radicals and an active oxygen species are needed for the effective oxidation of formaldehyde to $CO_2$ and $H_2O$ over the anatase form of $TiO_2$. P25 crystallites have an average crystallite size of about 20 nm and a BET surface area of about 50 $m^2$/gram. As used herein, BET, stands for the well known method of Brunauer, Emmett, and Teller, (J.A.C.S. 60 (1938) 309) surface science to calculate surface areas of solids by physical adsorption of gas molecules. This has been automated to a certain degree by instruments like the Micromeritics® 2010.

Table 1 provides a comparison of average crystallite size with various measures of surface area, including the anatase and rutile forms of $TiO_2$.

| Average crystallite size, nm | Surface area/ skeletal volume, $m^2/cm^3$ | Available surface area $m^2/cm^3$ | Specific surface area, $m^2/g$ anatase | Specific surface area $m^2/g$ rutile |
| --- | --- | --- | --- | --- |
| 5 | 1200 | 800 | 208 | 188 |
| 6 | 1000 | 667 | 174 | 156 |
| 7 | 857 | 571 | 149 | 134 |
| 8 | 750 | 500 | 130 | 117 |
| 9 | 667 | 444 | 116 | 104 |

-continued

| Average crystallite size, nm | Surface area/ skeletal volume, m²/cm³ | Available surface area m²/cm³ | Specific surface area, m²/g anatase | Specific surface area m²/g rutile |
|---|---|---|---|---|
| 10 | 600 | 400 | 104 | 94 |
| 11 | 545 | 364 | 95 | 85 |
| 12 | 500 | 333 | 87 | 78 |
| 13 | 462 | 308 | 80 | 72 |
| 14 | 429 | 286 | 74 | 67 |
| 15 | 400 | 267 | 69 | 63 |
| 16 | 375 | 250 | 65 | 59 |
| 17 | 353 | 235 | 61 | 55 |
| 18 | 333 | 222 | 58 | 52 |
| 19 | 316 | 211 | 55 | 49 |
| 20 | 300 | 200 | 52 | 47 |
| 21 | 286 | 190 | 50 | 45 |
| 22 | 273 | 182 | 47 | 43 |
| 23 | 261 | 174 | 45 | 41 |
| 24 | 250 | 167 | 43 | 39 |
| 25 | 240 | 160 | 42 | 38 |
| 27 | 222 | 148 | 39 | 35 |
| 29 | 207 | 138 | 36 | 32 |
| 31 | 194 | 129 | 34 | 30 |
| 33 | 182 | 121 | 32 | 28 |
| 35 | 171 | 114 | 30 | 27 |
| 37 | 162 | 108 | 28 | 25 |
| 39 | 154 | 103 | 27 | 24 |
| 40 | 150 | 100 | 26 | 23 |

Deactivation of the photocatalyst limits the effectiveness of photocatalytic air purifiers, and can occur reversibly or irreversibly. As the photocatalysts in air purification systems become deactivated, the systems become less efficient. Maintenance is required in order to clean, repair, and replace equipment. This results in increased operating expenses associated with the air purification systems.

Accordingly, there is a need for an air purification system containing a photocatalyst that can resist deactivation in general and/or can resist deactivation due to sudden and/or prolonged rises in contaminant concentration.

SUMMARY OF THE INVENTION

The present disclosure provides a purification device having deactivation resistant photocatalysts and deactivation resistant photocatalysts.

These and other advantages and benefits of the present disclosure are provided by an air purification device having a porous photocatalyst for removing at least a portion of gaseous volatile organic compounds from an air stream in the presence of light.

A method of purifying an air stream is also provided. The method includes passing the air stream over a photocatalyst sufficient to oxidize at least a portion of the volatile organic compounds in the air stream.

The above-described and other advantages and benefits of the present invention will be appreciated and understood by those skilled in the art from the following detailed description, drawings, and appended claims.

DETAILED DESCRIPTION OF THE INVENTION

It has recently been discovered by the present disclosure that photocatalysts in prior art air purification devices can be deactivated due to the mineralization of silicon compounds, such as siloxanes, on the photocatalysts. It has been determined that the siloxanes arise primarily from the use of certain aerosol-based personal care products, such as hairspray, or dry cleaning fluids. However, siloxanes can also be generated through the use of room temperature vulcanization (RTV) silicone caulks, adhesives, and the like. When siloxanes are oxidized, non-volatile silicon dioxide or hydrated silicon dioxide is formed, which are believed by the present disclosure to act to deactivate the photocatalyst. Without wishing to be bound by any particular theory, it is believed that the deactivation of photocatalysts by such siloxanes can occur through a number of mechanisms such as, but not limited to, the direct physical blockage of the active sites of the photocatalysts and/or by preventing the VOCs from interacting with the active agent.

The photocatalyst is titanium dioxide, including suitably doped titanium dioxide $TiO_2$ supporting about a monolayer of another material like tungsten oxide or nanosized metal crystallites, as well as zinc oxide, tin oxide or other photocatalytic materials.

The present disclosure also contemplates the use of photocatalytic mixed metal oxides, an intimate mixture of nanocrystalline photocatalytic oxides and other oxides, such as, but not limited to titanium dioxide, zinc oxide or tin oxide.

It is known that titania photocatalysts such as Degussa P25 (Deanna C. Hurum, Alexander G. Agrios, and Kimberly A. Gray, J. Phys Chem. B, 107 (2003) 4545-4549) can be deactivated by certain airborne contaminants that upon oxidation leave a non-volatile deposit on the catalyst surface. Among the most prevalent of these materials are silicon compounds like siloxanes.

The subject of the present disclosure is a photocatalyst rendered deactivation resistant by its porous morphology. Specifically, the photocatalysts have a pore structure with low mass transfer resistance and resists blockage by deposits. This pore structure, preferably comprised of cylindrical pores, having the majority of the surface area with pores that are 5 nm in diameter or larger and at least 200 m² surface area/cm³ of skeletal volume of the aggregate photocatalyst has pores that are 6 nm in diameter or larger. The overall distribution of pore size in the aggregate photocatalyst has a mode of 10 nm or greater, where mode is used to mean the most frequently occurring number or size in a set. This pore structure results in photocatalysts that are resistant to deactivation by environmental contaminants such as siloxane.

Figure 4:
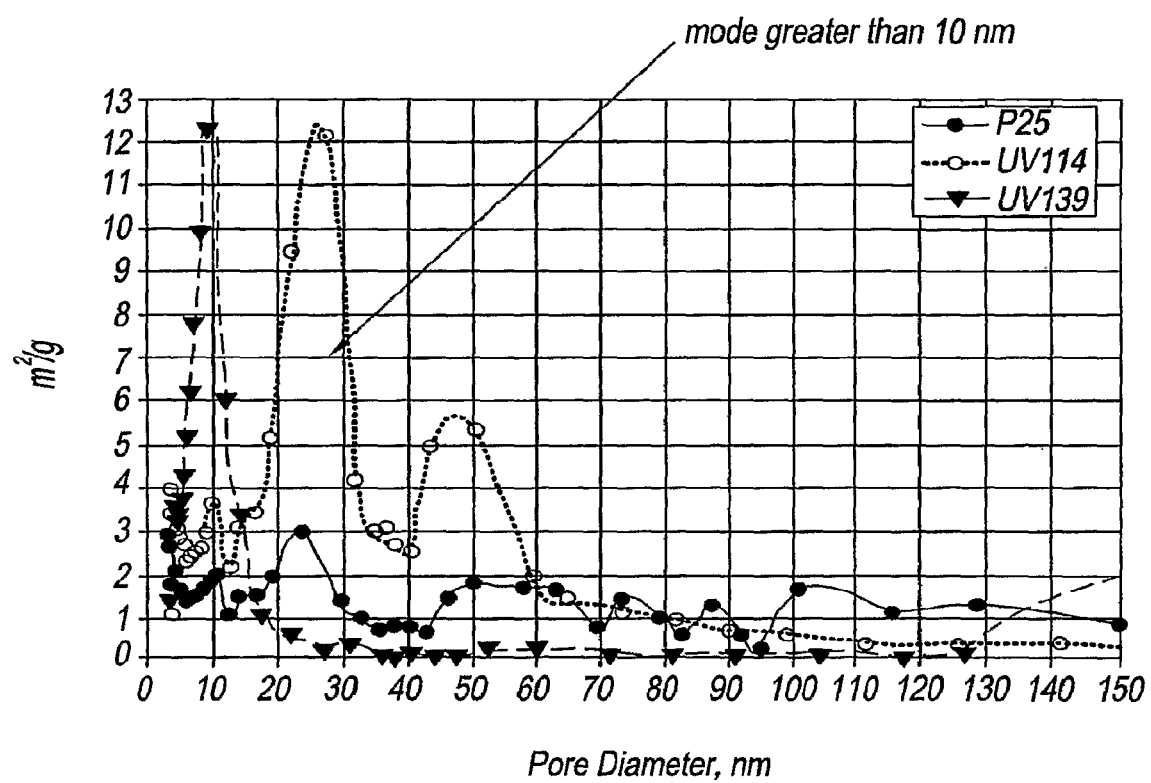
FIG. 4 illustrates the distribution profile of pore sizes for photocatalysts of the present disclosure as compared with other photocatalysts.

The porosity or pore structure of the photocatalyst can be characterized by its BET (Stephen Brunauer, P. H. Emmett, and Edward Teller, Journal of the American Chemical Society, Vol. 60, 1938, PP 309-319) surface area, SA, and pore size distribution (PSD). These can be determined using the Micromeritics® ASAP 2010 instrument or its equivalent with its accompanying software packages that included BJH (Barrett, Joyner and Halenda, 1951) analysis for mesopore adsorption and pore size distribution. It is preferred that a mode of this pore size distribution is 10 nm or larger as illustrated in FIG. 4.

The photocatalyst of the present disclosure shows that surprisingly the rate of activity loss expressed as % of initial single pass efficiency lost per hour does not decrease with an increase in BET SA as might be expected. Also, the rate of activity loss does not correlate with the surface area in pores smaller than 4 nm. However the rate of activity loss decreases, that is, the life expectancy of the catalyst increases with the SA in pores greater than or about equal to 6 nm in diameter.

Figure 1:
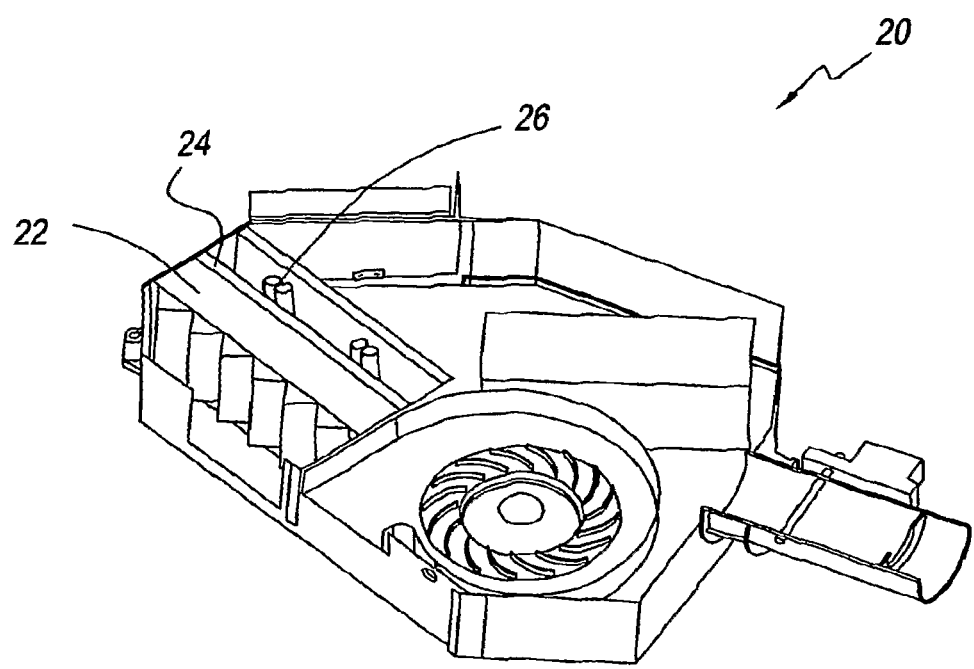
FIG. 1 is an air treatment device.

Referring to the drawings, and, in particular, FIG. 1, a simple photocatalytic air purification device, such as the air treatment device having deactivation resistant photocatalyst for removing contaminants from the air is shown. The purification device 20 comprises a filter 22, a photocatalyst 24, and a UV lamp 26. Filter 22 removes particulates and optionally has adsorption properties with a preference for siloxanes. The deactivation resistant photocatalyst 24 has crystallites of less than 14 nanometers (nm) in diameter with at least 200 m$^2$ surface area/cm$^3$ of skeletal volume in cylindrical pores of 5 nm in diameter or larger, with the mode of the pore size distribution 10 nm or more.

Figure 2:
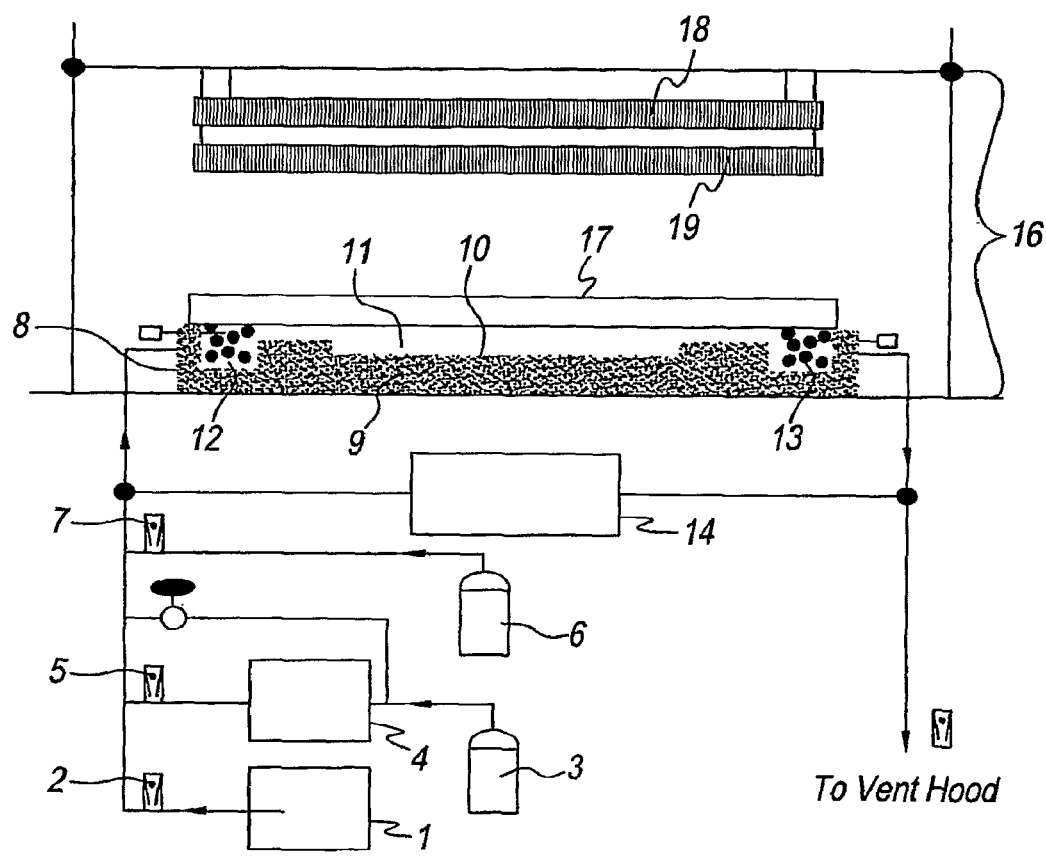
FIG. 2 is an illustration of a laboratory flat plate Intrinsic Rate Reactor (IRR).

Referring to FIG. 2, there is provided a laboratory flat plate intrinsic rate reactor 8. The reactor 8 has a VOC supply 1 and a VOC mass flow controller 2. The reactor 8 has a nitrogen supply 3 that feeds in to a water bubbler 4, and then to a moist nitrogen mass flow controller 5. Reactor 8 also has an oxygen supply 6 and oxygen mass flow controller 7. Reactor 8 has a machined aluminum block 9, which has a bed 10 for the catalyst-coated slide 11. Reactor 8 has glass beads 12, 13, that serve to mix and distribute gas. A UV transparent window 17 is positioned above the catalyst coated slide 11 to seal the reactor. The gas atmosphere within the reactor 8 is analyzed by gas analyzer 14. The reactor has an exit gas flow meter (not shown). Reactor 8 has a first UV-A lamp 18 and a second UV-A lamp 19. The height of the lamps may be adjusted by the lamp height adjustment 16.

Exemplary embodiments of the nanocrystalline TiO$_2$ having a high surface area and large pore structure according to the present disclosure were tested and compared for deactivation rates to Degussa P25 TiO$_2$, and the results are provided in Example 1 below.

Example 1

In this example, the conventional BET-specific surface area measurement units of m$^2$/g are used for convenience. 1" by 3" slides were coated with an aqueous suspension of nanocrystalline TiO$_2$ and allowed to dry. The TiO$_2$ coating was sufficient to absorb about 100% of the incident light when used in the intrinsic rate reactor according to FIG. 2. This reactor is a flat plate photocatalytic reactor having UV illumination that is provided by two black-light lamps (SpectroLine XX-15A). The spectral distribution was symmetrical about a peak intensity located at about 352 nm and extended from 300 nm to 400 nm. The illumination intensity was varied by adjusting the distance between the lamp and the titania-coated slide. UV intensity at the reactor surface was measured by a UVA power meter. High-purity nitrogen gas passed through a water bubbler to set the desired humidity level. The contaminants were generated either from a compressed gas cylinder, such as propanal/N$_{21}$ or from a temperature controlled bubbler. An oxygen gas flow was then combined with the nitrogen and contaminant flows to produce the desired carrier gas mixture (15% oxygen, 85% nitrogen).

The titania-coated slides were placed in a well, measuring 1" by 18" that was milled from an aluminum block. The well was then covered by a quartz window that was about 96% UVA transparent. Gaskets between the quartz window and aluminum block created a flow passage above the titania-coated slides. The flow passage had a 1" width and a 2 mm height.

Contaminated gas entered the reactor by first passing through a bed of glass mixing beads. Next, the gas flow entered a 1" by 2 mm entrance region of sufficient length (3") to produce a fully-developed laminar velocity profile. The gas flow then passed over the surface of the titania-coated slides. Finally, the gas passed through a 1" by 2 mm exit region (3" long) and the second bed of glass beads before exiting the reactor.

Figure 3:
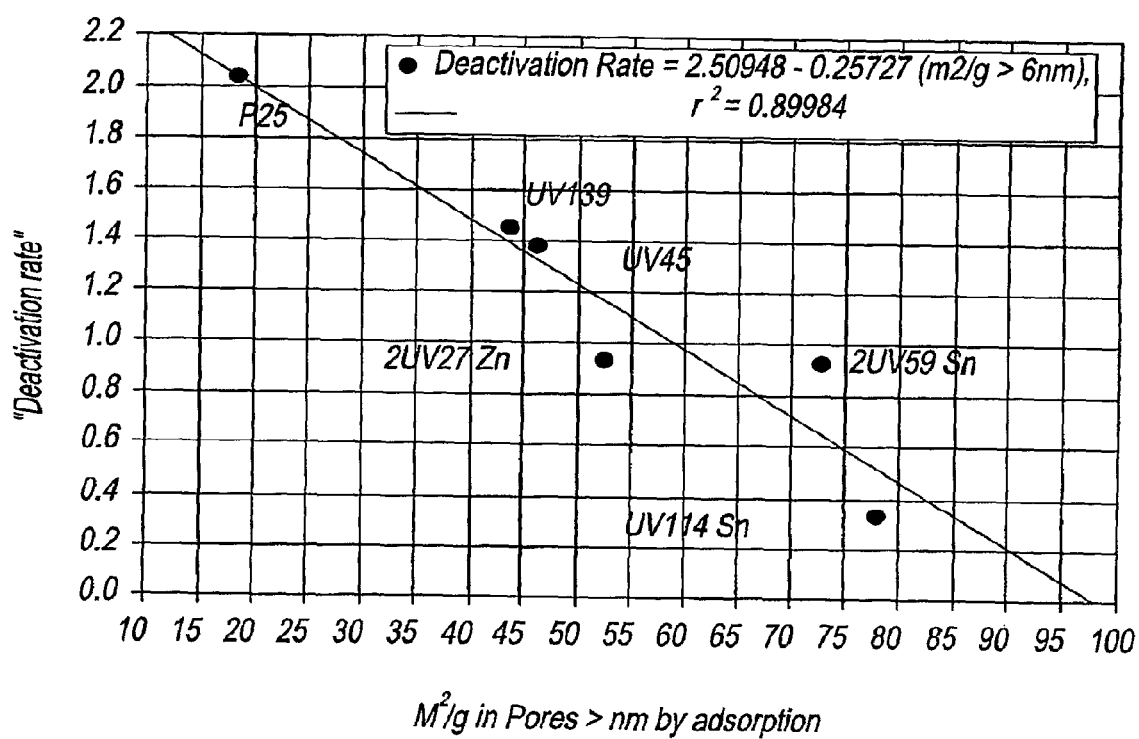
FIG. 3 illustrates the longevity of various $TiO_2$ based photocatalysts in the presence of 90 ppb hexamethyldisiloxane.

Referring now to FIG. 3, the longevity of various TiO$_2$ based photocatalysts was determined in the presence of 90 ppb hexamethyldisiloxane, using the intrinsic rate reactor of FIG. 2. The deactivation rate of the photocatalyst was determined by the slope of a straight line that represents the catalyst performance during its initial stages of operation. The value for P25 represents the average of several tests.

As shown by data in Table 2 below, and as shown graphically in FIG. 3, the rate of photocatalytic activity loss, expressed in % initial activity per hour, decreases as the surface area in pores greater than or about equal to 6 nm becomes larger. However, this linear relationship does not hold with the total BET surface area, or the surface area in pores greater than about 4 nm in diameter, as determined by N$_2$ adsorption and BJH analysis of this adsorption as performed by a Micrometrics® ASAP 2010 surface area determination unit.

TABLE 2

| Catalyst | Rate of activity loss, % Initial activity/hr | BET | BET APD | SA ≧ 4 nm | SA ≧ 5 nm | SA ≧ 6 nm |
|---|---|---|---|---|---|---|
| P25 | −2.04 | 52.0 | 8.8 | 25.5 | 20.7 | 18.5 |
| UV139 | −1.45 | 66.6 | 8.9 | 59.2 | 49.8 | 43.5 |
| UV45 | −1.38 | 64.6 | 22.0 | 50.8 | 47.6 | 46.0 |
| 2UV27 | −0.93 | 123.1 | 7.2 | 101.2 | 71.7 | 52.3 |
| 2UV59 | −0.92 | 82.5 | 21.4 | 76.3 | 74.5 | 72.7 |
| UV114 | −0.33 | 99.4 | 21.4 | 85.0 | 80.3 | 77.8 |

Referring now to FIG. 4, the distribution of pore sizes for photocatalysts P25, UV139, and UV114 are shown as the relation of pore diameter, in nm (X-axis) and Specific Surface Area, in m$^2$/g (Y-axis). When the data of Table 2 is considered in light of the pore size distribution data in FIG. 4, the photocatalysts with the lowest deactivation rates not only possess increased surface area in pores of greater than about 6 nm, but also the mode (i.e., most prevalent) pore size is about 10 nm or greater, and may be bimodal, as shown by the graph of pore size for UV114.

The data in Table 2 shows that UV114, which has about 4.2 times the surface area in pores greater than about 6 nm as compared with P25, has a projected life that is at least 6 times longer than P25 when challenged by hexamethyldisiloxane at a concentration of 90 ppb, under the same UV illumination. Extrapolating these data to a time-averaged concentration of 2 ppb of siloxanes, and assuming that the deactivation rate is linear with respect to concentration of contaminants, UV114 should retain at least 20% of its initial activity after about 10,000 hours, while P25 would be projected to lose about 80% of its initial activity after only about 1,700 hours, under the same challenge of siloxanes. It is important to note that the catalyst with the highest total BET surface area, 2UV27 does not have the lowest deactivation rate.

For Example 1, 1 ppm propanal was oxidized by UV-A light at 50% relative humidity, under conditions where about 20% of the propanal was initially oxidized. The deactivation agent was 90 parts per billion (ppb) hexamethyldisiloxane.

Under these conditions, increasing the pore surface area from about 18.5 $m^2/g$ in P25 (by BJH $N_2$ adsorption) to about 77.8 $m^2/g$ in Sn-doped $TiO_2$ (designated as UV114 of the present disclosure) decreased the rate of deactivation of the photocatalyst from a loss of about 2.05% per hour (for P25) to a loss of about 0.34% per hour for UV114, as compared with their initial photocatalytic activities, respectively.

Thus, assuming that the photocatalytic deactivation rate is proportional to the siloxane concentration, the activity of P25, in the presence of 90 ppb hexamethyldisiloxane, would be expected to drop to about 50% of its initial activity in about 24 hours. Extrapolating these results to a smaller concentration of the deactivating agent, 1 ppb hexamethyldisiloxane, the photocatalytic activity of P25 would be expected to drop to about 50% of its initial activity in 90 days. By comparison, the photocatalytic activity of UV114 would be expected to drop to about 50% of its initial activity after 550 days in the presence of 1 ppb of hexamethylsiloxane.

Example 2

Figure 5:
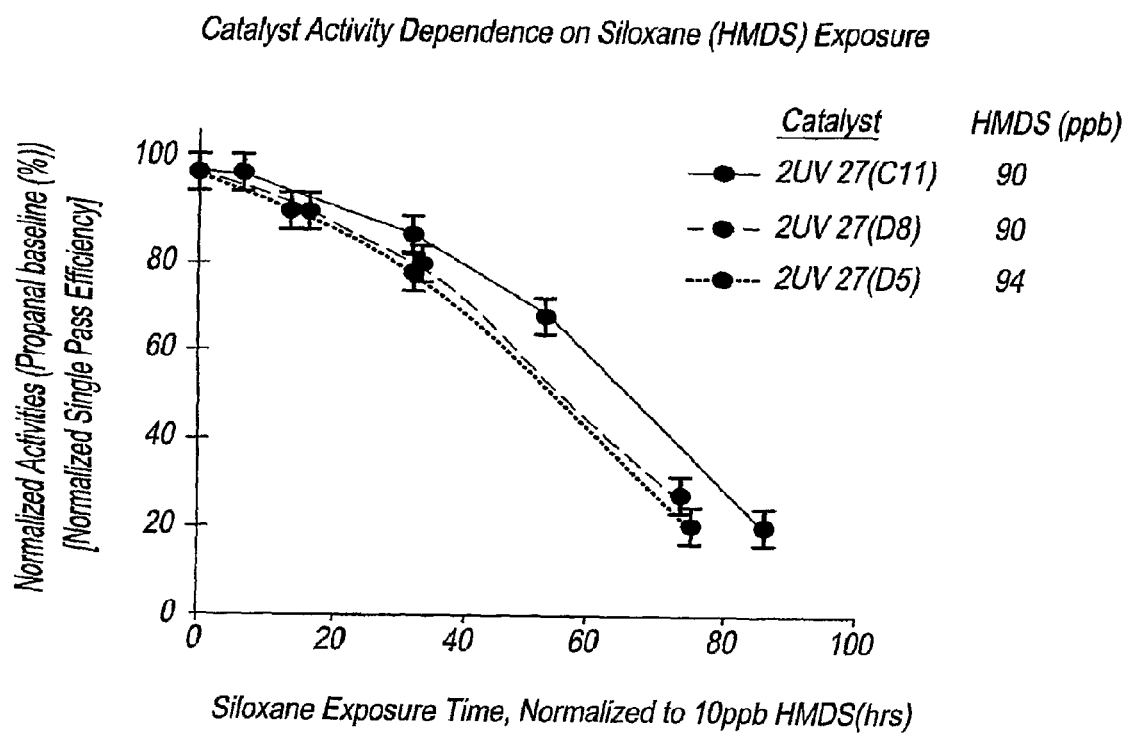
FIG. 5 illustrates effects of hexamethyldisiloxane concentrations on the deactivation rate of siloxane-resistant catalyst 2UV 27.

FIG. 5 illustrates the results of an experiment showing the effect of various hexamethyldisiloxane concentrations on the deactivation rate of a siloxane-resistant catalyst, 2UV27. The abscissa, siloxane exposure time, was normalized to a selected hexamethyldisiloxane level (90 ppb). The linear scaling factor was equal to the exposure time multiplied by the hexamethyldisiloxane concentration divided by 90. Each catalyst was exposed to a controlled level of hexamethyldisiloxane for various periods of time. Periodically, the photocatalytic activity, and hence the rate of deactivation, was determined at various times, using propanal as the probe gas.

As shown in FIG. 5, the further a data curve trends to the right, the lower the deactivation rate of the photocatalyst. As the rate of deactivation of the photocatalyst decreases, this will correspond to a longer photocatalyst life. As shown by the data curves for 34 ppb hexamethyldisiloxane and 90 ppb hexamethyldisiloxane, the relationship between photocatalyst life and hexamethyldisiloxane concentration is non-linear. A lower concentration of hexamethyldisiloxane thereby results in a progressively longer catalyst life.

For example, in the particular instance of a deactivation level corresponding to the 50% loss in propanal activity, when the hexamethyldisiloxane level was decreased from 90 ppb to 34 ppb, the photocatalyst life increased by a factor of about 1.2 (ratio of normalized exposure time) over the linear increase corresponding to the ratio of hexamethyldisiloxane concentration (i.e., 2.65 equals 90 divided by 34), for a net increase in life of 3.18 times (i.e., 1.2×2.65). The inference from such data is that lowering the hexamethyldisiloxane concentration, as by using an adsorbent filter, for example, would result in a non-linear increase in photocatalyst life.

While the present disclosure has been described with reference to one or more exemplary embodiments, it will be understood by those skilled in the art that various changes may be made and equivalents may be substituted for elements thereof without departing from the scope of the present disclosure.

The invention claimed is:

1. A method of using a photocatalyst to remove contaminants from air, comprising:
   irradiating the photocatalyst with UV light; and
   contacting the air with the photocatalyst,
   wherein the photocatalyst comprises nanocrystallites of $TiO_2$ of less than 14 nanometers in diameter with at least 200 $m^2$ surface area/$cm^3$ of skeletal volume in pores of 5 nm in diameter or larger, with the mode of the pore size distribution 10 nm or more, the nanocrystallites of $TiO_2$ comprising a coating or layer of a dopant material selected from the group of metal, metal oxide, non-metal, and any combinations thereof.

2. The method of claim 1, wherein the photocatalyst pores are predominately cylindrical.

3. The method of claim 1, where the $TiO_2$ of the photocatalyst is primarily anatase.

4. The method of claim 1, wherein the nanocrystallites of $TiO_2$ have a plurality of pores with a diameter of at least 5 nm.

5. The method of claim 1, wherein the nanocrystallites of $TiO_2$ are disposed in aggregates that have at least 200 $m^2$ surface area per $cm^3$ of skeletal volume in cylindrical pores of at least 6 nm in diameter.

6. The method of claim 1, wherein the dopant material is combined with the nanocrystallites of $TiO_2$ in the ratio of $Ti_{(1-x)}M_xO_2$ where Ti is titanium, x is a mole percentage and M is the doping material.

7. The method of claim 1, wherein the dopant material comprises a metal selected from the group consisting of tin, iron, zinc, cerium, neodymium, niobium, tungsten, and any combinations thereof.

8. The method of claim 1, wherein the dopant material comprises a non-metal that is nitrogen.

9. The method of claim 1, wherein the nanocrystallites of titanium dioxide are less than 12 nanometers in diameter.

10. The method of claim 1, wherein the nanocrystallites of $TiO_2$ form porous particles of less than 1 micron.

11. The method of claim 1, wherein the air comprises a siloxane contaminant.

12. The method of claim 1, wherein said photocatalyst is disposed on a substrate.

* * * * *